Figure 1:
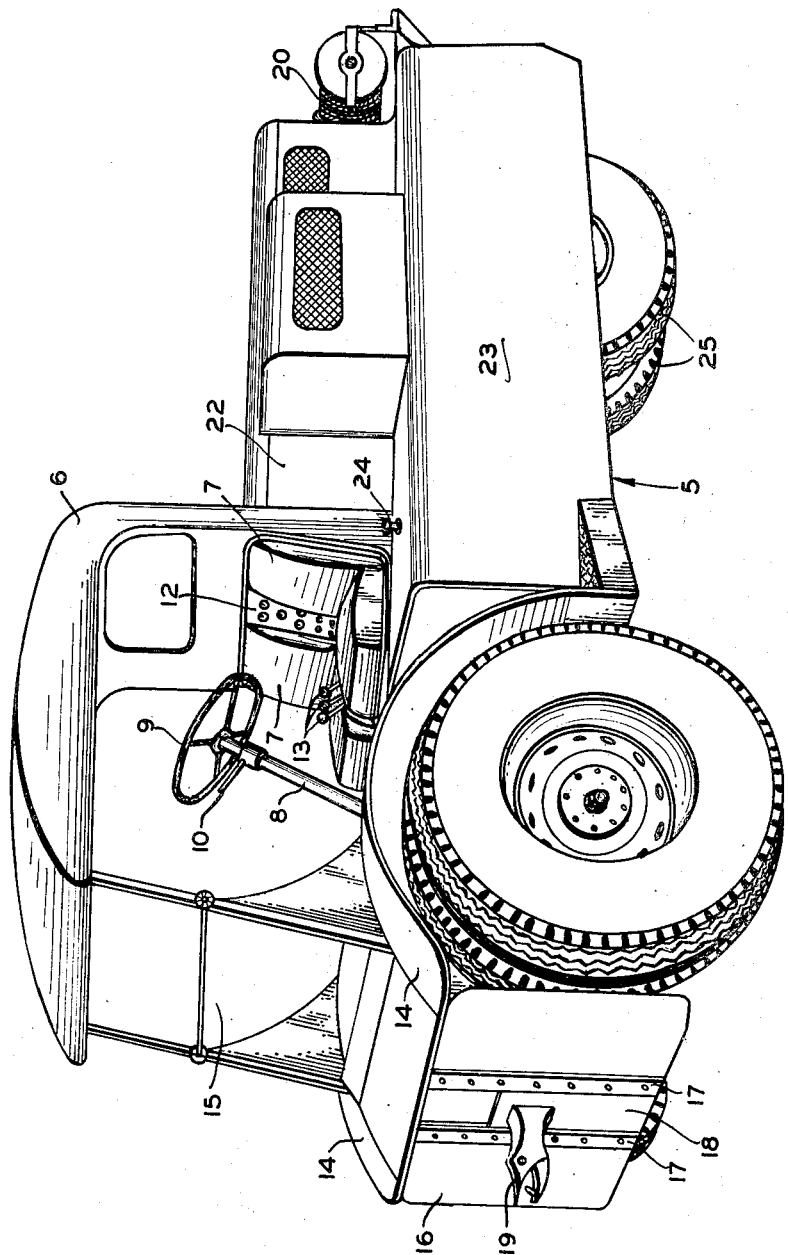

Patented Sept. 8, 1953

2,651,377

UNITED STATES PATENT OFFICE 2,651,377

STEERING BY DRIVING INTERLOCKED WITH MANUAL STEERING

Robert Lapsley, Berrien Springs, and George L. Turner, Niles, Mich., assignors to Clark Equipment Company, Buchanan, Mich., a corporation of Michigan Application November 14, 1949, Serial No. 127,204

8 Claims. (Cl. 180—6.3)

This invention relates to industrial tractors and, more particularly, is concerned with an industrial tractor of the type which is adapted to tow, either in a forward or reverse direction, or to push in either direction for moving large trailers or similar vehicles, or used around airports and the like for towing or pushing planes and similar types of heavy equipment.

One of the primary objects of the present invention is to provide an industrial vehicle of this type which has marked improvements in maneuverability over previous vehicles of this general nature. It is also the object of the present invention to provide a vehicle of this type having a very short turning radius, so that it can be pivoted substantially within its own length to secure operation in limited areas and the like, while yet allowing the vehicle to be of such size as to have sufficient flotation to allow its use upon floors or surfaces which do not have to be especially reinforced.

A still further object of the present invention is to provide a vehicle of this type in which the usual type of friction clutch normally associated with automotive vehicles is eliminated, and a smooth cushion-type clutching means is provided between the source of power and the driving train, so that the vehicle can exert a corresponding smooth pulling effort upon the mechanism to be towed or pushed.

One of the features of the present invention resides in providing a vehicle of this type with a driving axle in which the wheels at opposite ends of the axle are independently driven and with which is associated a steering wheel control so that the wheels at one side of the vehicle may be either stopped or rotated in a reverse direction with respect to the opposite wheels, to produce the short turning radius, thus allowing the truck to pivot substantially about the longitudinal center of the drive axle. This is provided in conjunction with a caster type mounting of the rear or steering wheels, with the steering control being so arranged as to effect this driving of the wheels independently through turning of the steering wheel, thus eliminating any special control on the part of the operator.

The invention further contemplates a mechanism where the braking effort can be applied to either of the drive wheels independently, or to both of the drive wheels simultaneously, whereby the vehicle can be partially steered by the braking action.

Other objects and advantages of the present invention will appear more fully from the following detailed description which, taken in conjunction with the accompanying drawings, will disclose to those skilled in the art, the particular construction and operation of preferred forms of the present invention.

In the drawings, Figure 1 is a perspective view of an industrial tractor embodying the present invention.

Figure 2:
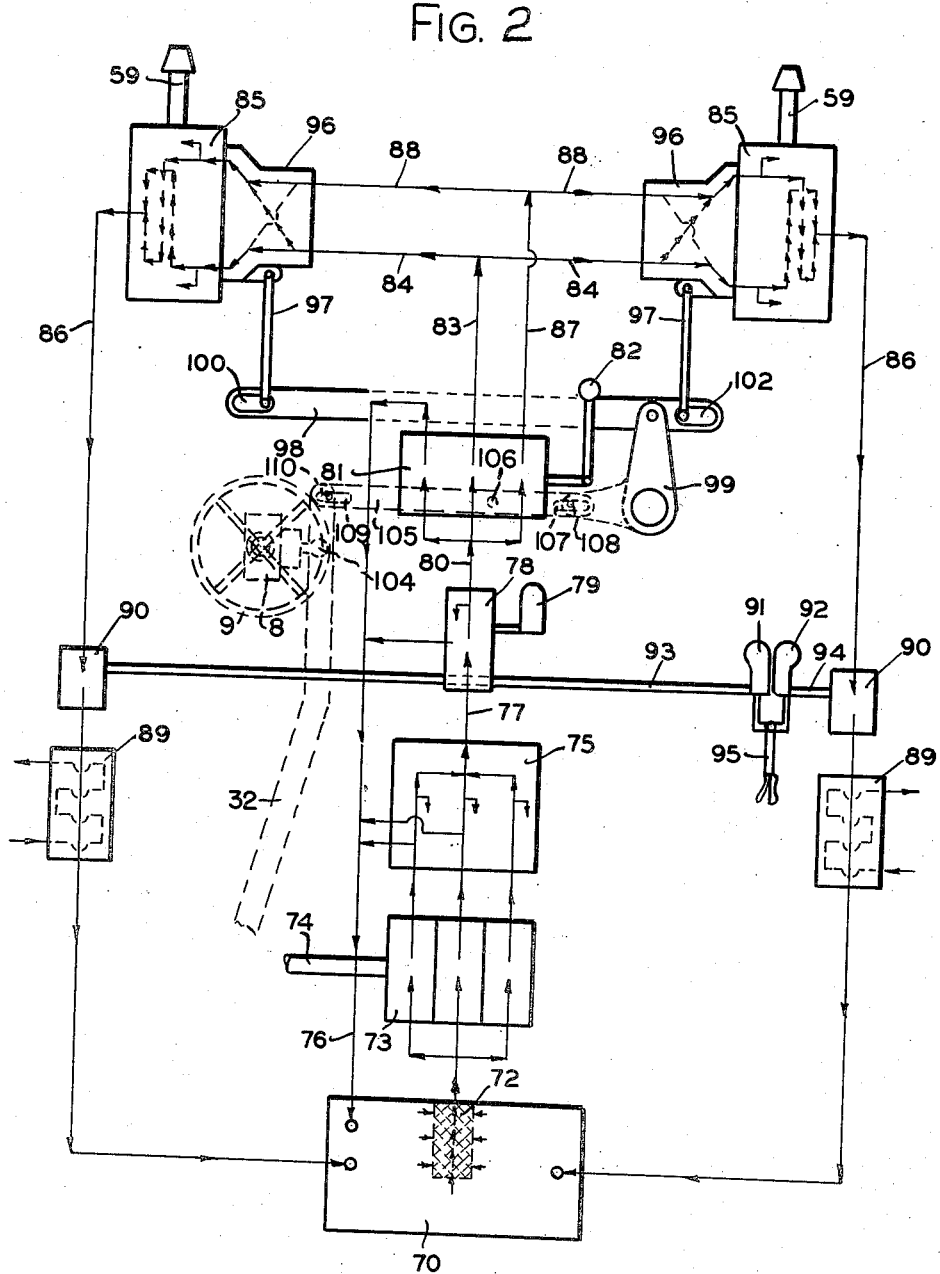
Figure 3:
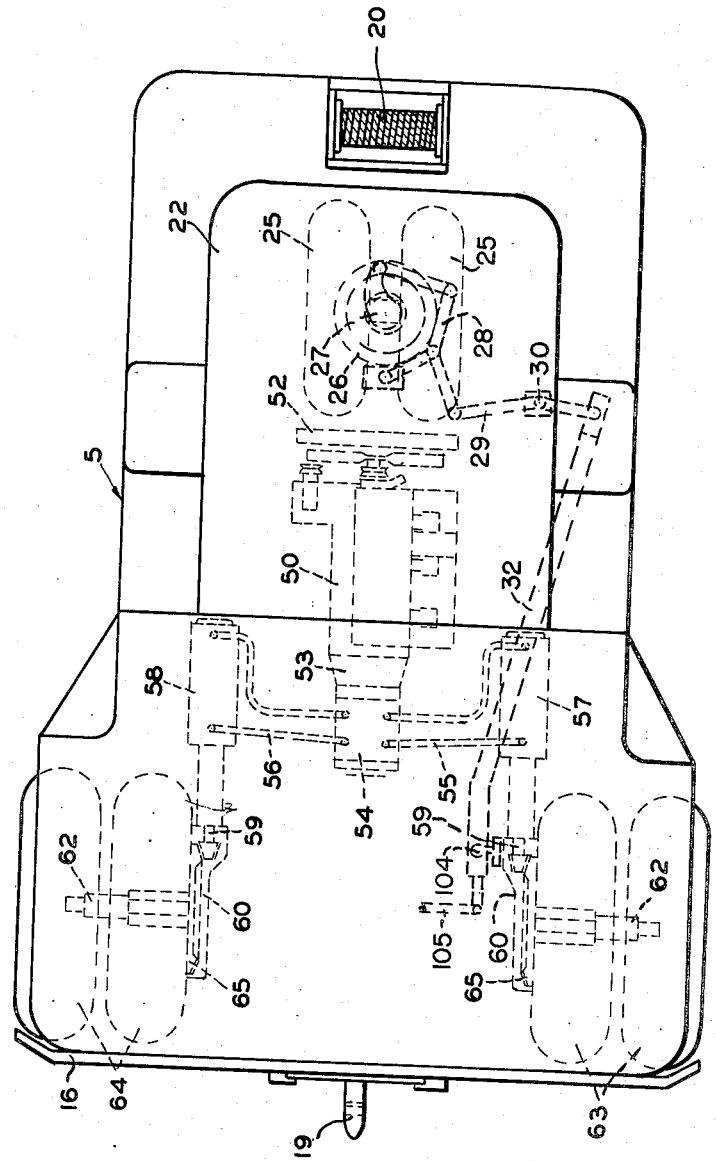

Figure 2 is a schematic layout of the hydraulic circuit of our present invention embodied in the industrial tractor of Figure 1; and Figure 3 is a top plan view of the industrial tractor shown in Figure 1 with a diagrammatic showing of the drive means therefor which forms the subject matter of our present invention.

Referring now in detail to the drawings, the industrial tractor is indicated generally at 5 in Figure 1, and includes a cab 6 having therein seats 7. Positioned in line with one of the seats 7 is the steering column 8 upon which is mounted the steering wheel 9 and the control member 10. Intermediate the seats 7 there is an instrument panel 12, carrying suitable instruments such as the ammeter, oil pressure gage, ignition switches, and other control instruments. Also intermediate the seats are certain control levers, indicated generally at 13, for a purpose to be hereinafter described.

Extending clear across the transverse portion of the vehicle between the fenders 14 is a windshield 15, which windshield, it will be noted, extends down to the top of the chassis thereby giving the operator substantially clear vision over the forward end of the vehicle. This end of the vehicle is adapted to carry a pusher plate or bumper plate 16, which is provided with two vertical slides 17 within which is adapted to be mounted an axial plate 18 carrying a coupling mechanism 19. The coupling mechanism may be readily detached from the plate 16 when it is desired to use the plate as a pusher or bumper plate, or can be used for attachment to a coupling gear secured to the landing wheels of an airplane or the like when used for airport work.

In the rear end of the vehicle, there is provided a winch 20 which, preferably, is power controlled through one of the control levers 13 from a power take-off on the motive power of the vehicle.

The prime mover for the vehicle is preferably housed within the housing 22 extending rearwardly of the rear wall of the cab 6 and the gas tank is preferably located in the side portion 23 of the chassis, with the closure cap being indicated at 24.

Mounted centrally of the vehicle, substantially adjacent the rear end thereof, are a pair of dual wheels 25 which, preferably, are mounted upon a caster support 26, as shown in Figure 3, for rotation with a shaft 27 controlled by suitable linkage, indicated at 28, connected to the bell crank lever 29 which is fixed intermediate its ends upon the pivot 30, and at its opposite end is connected to the drag link 32 extending forwardly to the bottom end of the steering column 8. The drag link 32 has suitable connection with the steering column 8 through a ball and socket joint 104 whereby rotary movement of the column 8 will produce rectilinear movement of the drag link 32.

This steering mechanism is substantially similar to that shown in the co-pending application of George L. Turner, Serial No. 99,779, filed June 17, 1949.

Referring to Figures 2 and 3, there is shown an arrangement for controlling the driving torque to the vehicle which consists, primarily, in a fluid drive. In this form of the invention, the prime mover or engine 50 is preferably of the internal combustion type having the radiator 52 and having a clutch housing 53 to which is connected a combination hydraulic pump and motor unit 54 which may be of the compound type having three stages of delivery of fluid under pressure which may be controlled through any suitable valve mechanism in conjunction with the throttle control of the engine 50.

The pump and motor unit 54 is adapted to have outlet lines 55 and 56 leading therefrom to fluid operated motors 57 and 58, respectively, these fluid motors being so arranged that fluid under pressure will operate to impart rotary movement to the pinion shafts 59 extending therefrom and into the drive housings 60 mounted on the frame of the vehicle and supporting the wheel spindles 62. Mounted on the wheel spindles 62 are the drive wheels 63 and 64 at opposite sides of the vehicle, the pinion 59 driving suitable ring gears 65 connected to the spindles 62 for imparting rotary movement to the driving wheels.

The special fluid control system for the vehicle shown in Figure 3 is shown diagrammatically in Figure 2 and reference will now be had to this figure.

In this control system, there is provided a sump 70 to which the fluid from the driving motors, etc., is returned. From this sump, fluid is drawn through the screen 72 into the pump unit 73, as indicated by the arrows, the pump unit 73 being driven from the motor by means of the connection 74 in any conventional manner. The pump unit 73 is preferably of the rotary abutment type and has the three stages of pump pressure, the first stage delivering fluid under low volume but high pressure and progressively increasing in volume and decreasing in pressure through the other two stages; these stages being controlled by a suitable valve mechanism which may be actuated through one of the control levers 13.

A suitable control mechanism is indicated at 75, whereby the fluid under pressure from the pump 73 is valved for return when the vehicle is in neutral position back to the sump 70 through the line 76, or forward into the clutch through the line 77. The clutch, indicated generally at 78, may be controlled by a suitable clutch pedal 79 which, in effect, acts as a valve mechanism either by passing the fluid from the control mechanism 75 through the lines 76, or for passing the fluid on, when the pedal 79 is released, through lines 80 into the directional control valve mechanism 81, which is preferably controlled by the valve control lever 82. By operating the lever 82, fluid may be transmitted through the line 83 and through the branch lines 84 to the fluid motors 85, corresponding to the fluid motors 57 and 58 of Figure 3, whereby the fluid goes through these fluid motors, as indicated by the arrows, for imparting driving torque to the pinion shafts 59 and then returns to the sump through the lines 86.

The valve control lever 82 when actuated in the opposite direction, causes the fluid in the control member 81 to pass through line 87 and through branch lines 88 to the opposite connections of the fluid motors 85, thereby imparting reverse torque to the pinion shafts 59. In either event, the discharge fluid from the wheel motors 85 passes through the lines 86 and through suitable heat exchangers 89 back to the sump 70.

Interposed in the return lines 86 are suitable brake valves 90 controlled by foot operated brake pedals 91 and 92. Brake pedals 91 and 92 are so arranged that they may be used selectively to operate the brake valves 90, through the shafts 93 and 94 to brake one or the other of the wheel motors 85 by stopping the discharge of fluid therefrom, or may be jointly operated when it is desired to impart braking effort to both wheels. A suitable hand service brake 95 may also be provided for parking purposes.

Mounted adjacent the wheel motors 85 are reversing valve mechanisms 96 which, as shown by the dotted line arrows, can be used for reversing the direction of flow from either the branch lines 84 or 88 to the wheel motors. The reversing valves are controlled by control levers 97, interconnected through the tie bar 98 to a rocker arm 99 controlled by the steering mechanism. The interconnecting linkage between the drag link 32 and rocker arm 99 comprises a link 105 which is pivotally mounted intermediate of its ends at 106. The link 105 has formed in its one end a slot 107 which receives a pin member 108 carried by the rocker arm 99. The link 105 has formed in its other end a slot 109 in which is received a pin member 110 secured to the drag link 32. It will be noted that there are lost motion connections 100 and 102 in the tie bar so that upon movement of the rocker arm 99 to the left, for example, the control lever 97 at the right will move through the space 102 and will not be actuated, while the other control lever 97 will immediately be actuated to provide for reversing actuation of the valve mechanism 96, thereby causing reverse torque to be applied to the associated pinion shaft 59.

Thus, in normal operation with the vehicle proceeding forwardly and the steering wheel being rotated by the operator to make a left hand turn, the control bar 98 will actuate the reversing motor 96 at the left hand side of Figure 4, causing the reversal of the direction of fluid flow to the wheel motor 85 associated therewith, thereby first slowing down rotation of the pinion shaft 59 in its normal direction, then stopping the same and reversing its direction of rotation to produce a pivoting movement of the truck in a left turn direction.

The clutch 79 is used only as a means of interconnecting the fluid under pressure to the forward or reverse control valve 81 controlled by the lever 82. The amount of fluid under pressure which is admitted is controlled through the valve mechanism 75 associated with the fluid pump 73. Braking of the vehicle at any time may be effected through the brake pedals 91 and 92 which, as previously described, can be operated either independently or simultaneously.

It is therefore believed apparent that we have provided a novel type of industrial tractor which has a very short turning radius as well as considerably improved maneuverability in small areas, and in which the transmission of the motor power to the drive wheels of the vehicle is through suitable cushioning means, through the fluid connections which form a cushioned medium of transmitting the torque to the driving wheels, thereby not only increasing the initial draw bar pull of the tractor but, also, eliminating any shock loads being transmitted from the tractor to whatever vehicle or load the tractor is either towing or pushing.

Also, the present invention provides for greatly increased visibility by the driver over the forward end of the vehicle, as well as simplifying the operation of the vehicle from the standpoint of controlling the driving power during the turning of the vehicle.

We are aware that various changes may be made in certain details of the present invention and, therefore, do not intend to be limited except as defined by the scope and spirit of the appended claims.

We claim:

1. In an industrial tractor having a caster-mounted type rear steering wheel assembly, a front transverse axle assembly, drive wheels at the ends thereof, an engine disposed rearwardly thereof, pump means driven by said engine for developing a variable fluid pressure, hydraulic drive motors for each of said wheels, control means for selectively varying the volume and pressure of said fluid, delivery means conducting said fluid from said control means to said motors, steering means for said rear steering wheel assembly, and separate control means actuated in response to movement of said steering means for independently reversing the direction of flow of said fluid through either of said motors to reverse the driving action of the associated drive wheel.

2. In an industrial tractor having a caster-mounted type rear steering wheel assembly, a front transverse axle assembly, drive wheels at the ends thereof, an engine disposed rearwardly thereof, pump means driven by said engine for developing a variable fluid pressure, hydraulic drive motors for each of said wheels, control means for selectively varying the volume and pressure of said fluid, delivery means conducting said fluid from said control means to said motors, steering means for said rear steering wheel assembly, and separate control means actuated in response to movement of said steering means for independently reversing the direction of flow of said fluid through either of said motors to reverse the driving action of the associated drive wheel, said separate control means providing for decreasing the flow of fluid to either motor prior to said reversing.

3. The tractor of claim 1 including selective means for braking said drive motors either selectively or conjointly by stopping the discharge of fluid therefrom.

4. The tractor of claim 1 including means interposed between said first-mentioned control means and said motors providing for forward or reverse drive of said motors independently of said steering means.

5. In an industrial tractor having a caster-mounted type rear steering wheel assembly, independent drive wheels at each side of the forward end of said tractor, steering means for said rear steering wheel assembly including a vertically pivotally mounted hand steering wheel assembly, fluid pressure-developing means, fluid motors for each of said drive wheels actuated by fluid from said pressure-developing means and including control means providing for forward or reverse drive at varying speeds, and means associated with said steering means and independent of said control means for successively slowing down one driving motor and thence reversing its direction of drive as said steering means is progressively actuated in one turning direction.

6. The tractor of claim 5 including selectively controlled means for selectively or conjointly braking said driving motors by stopping the discharge of fluid therefrom.

7. The tractor of claim 5 including means interposed between said pressure-developing means and said control means for bypassing said control means to provide a neutral position for said tractor.

8. Drive means for an industrial tractor having a caster-mounted type rear steering wheel assembly and laterally spaced independent drive wheels at the forward end thereof, comprising a fluid pump driven from a power source, means associated with said pump for delivering fluid therefrom at a plurality of ranges of pressure and volume, fluid motors at each of said wheels, forward and reverse control means for said motors, means for either connecting said fluid delivery means to said control means or returning said fluid to said pump, steering means for said rear steering wheel assembly, and independent control means responsive to actuation of said steering means for selectively reversing said fluid motors independently of said forward and reverse control means.

ROBERT LAPSLEY.
GEORGE L. TURNER.

References Cited in the file of this patent

UNITED STATES PATENTS

| Number | Name | Date |
|---|---|---|
| 740,666 | Leavitt | Oct. 6, 1903 |
| 1,254,057 | Moore | Jan. 22, 1918 |
| 1,641,813 | Johnston et al. | Sept. 6, 1927 |
| 2,004,928 | Centervall | June 18, 1935 |
| 2,046,517 | Jones | July 7, 1936 |
| 2,126,255 | Hacker | Aug. 9, 1938 |
| 2,393,324 | Joy | Jan. 22, 1946 |
| 2,396,506 | Harris | Mar. 12, 1946 |
| 2,530,574 | Getman | Nov. 21, 1950 |